(12) United States Patent
Honjo et al.

(10) Patent No.: US 8,761,440 B2
(45) Date of Patent: Jun. 24, 2014

(54) RANGE IMAGE GENERATION APPARATUS, POSITION AND ORIENTATION MEASUREMENT APPARATUS, RANGE IMAGE PROCESSING APPARATUS, METHOD OF CONTROLLING RANGE IMAGE GENERATION APPARATUS, AND STORAGE MEDIUM

(75) Inventors: Tomoya Honjo, Tokyo (JP); Masakazu Matsugu, Yokohama (JP); Ikuo Watanabe, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 154 days.

(21) Appl. No.: 13/310,995

(22) Filed: Dec. 5, 2011

(65) Prior Publication Data

US 2012/0155706 A1 Jun. 21, 2012

(30) Foreign Application Priority Data

Dec. 15, 2010 (JP) ................................ 2010-279867

(51) Int. Cl.
*G06K 9/00* (2006.01)
(52) U.S. Cl.
USPC .............................. 382/103; 382/206; 356/610
(58) Field of Classification Search
None
See application file for complete search history.

(56) References Cited

U.S. PATENT DOCUMENTS

| 4,622,594 | A | | 11/1986 | Honjo et al. |
| 4,653,104 | A | * | 3/1987 | Tamura ........................ 382/154 |
| 4,866,536 | A | | 9/1989 | Honjo et al. |
| 5,220,425 | A | | 6/1993 | Enari et al. |
| 6,621,921 | B1 | | 9/2003 | Matsugu et al. |
| 6,631,388 | B1 | | 10/2003 | Watanabe et al. |
| 7,007,002 | B2 | | 2/2006 | Matsugu et al. |
| 7,302,428 | B2 | | 11/2007 | Watanabe et al. |
| 2005/0084149 | A1 | * | 4/2005 | Aizawa et al. ................ 382/154 |
| 2009/0284757 | A1 | * | 11/2009 | Mayer et al. .................. 356/602 |
| 2010/0046801 | A1 | * | 2/2010 | Ishiyama ...................... 382/106 |
| 2012/0113268 | A1 | | 5/2012 | Ito et al. |

FOREIGN PATENT DOCUMENTS

JP 2002-022425 A 1/2002

OTHER PUBLICATIONS

P. Vuylsteke and A. Oosterlinck, "Range Image Acquisition with a Single Binary-Encoded Light Pattern", Feb. 1990, IEEE Transactions on Pattern Analysis and Machine Intelligence, vol. 12, No. 2, pp. 148-164.*
S.Y. Chen, Y.F. Li, and Jianwei Zhang, "Vision Proceeding for Realtime 3-D Data Acquisition Based on Coded Structured Light", Feb. 2008, IEEE transactions on Image Processing, vol. 17, No. 2, pp. 167-176.*

* cited by examiner

*Primary Examiner* — Bhavesh Mehta
*Assistant Examiner* — Siamak Harandi
(74) *Attorney, Agent, or Firm* — Fitzpatrick, Cella, Harper & Scinto (57) ABSTRACT

A range image generation apparatus includes: a generation unit adapted to generate a first range image of a target measurement object at one of a predetermined in-plane resolution and a predetermined depth-direction range resolving power; an extraction unit adapted to extract range information from the first range image generated by the generation unit; and a determination unit adapted to determine, as a parameter based on the range information extracted by the extraction unit, one of an in-plane resolution and a depth-direction range resolving power of a second range image to be generated by the generation unit, wherein the generation unit generates the second range image using the parameter determined by the determination unit.

15 Claims, 6 Drawing Sheets

RANGE IMAGE GENERATION APPARATUS, POSITION AND ORIENTATION MEASUREMENT APPARATUS, RANGE IMAGE PROCESSING APPARATUS, METHOD OF CONTROLLING RANGE IMAGE GENERATION APPARATUS, AND STORAGE MEDIUM

BACKGROUND OF THE INVENTION

1. Field of the Invention

The present invention relates to a range image generation apparatus, a position and orientation measurement apparatus, a range image processing apparatus, a method of controlling the range image generation apparatus, and a storage medium. The present invention particularly relates to a range image generation apparatus which generates range data of a target measurement object and performs image processing based on the range data, a position and orientation measurement apparatus, a range image processing apparatus, a method of controlling the range image generation apparatus, and a storage medium.

2. Description of the Related Art

In a three-dimensional range-measurement method using triangulation, when the measurement-point density is always constant, the in-plane resolution of range data decreases as the distance to the target measurement object increases. To perform measurement always at a predetermined in-plane resolution independently of the distance to the target measurement object, it is necessary to change the measurement-point density in accordance with the distance to the target measurement object.

As a method of changing the measurement-point density in accordance with the distance up to the target measurement object, a method as disclosed in Japanese Patent Laid-Open No. 2002-22425 has been examined.

In Japanese Patent Laid-Open No. 2002-22425, the distance up to the target measurement object is coarsely measured by light-propagation time measurement (TOF). Then, slit light is scanned by a light-section method in accordance with a scanning pitch determined based on the distance, thereby generating range data. In this case, the scanning pitch corresponds to the measurement-point density.

In the method of Japanese Patent Laid-Open No. 2002-22425, range data is generated based on the course range to the target measurement object. However, no consideration has been made about how to cope with a change in the in-plane resolution or depth-direction range resolving power requested for the generated range data in processing using the range data.

Generating range data having an in-plane resolution or depth-direction range resolving power higher than the requested resolution or range resolving power leads to an increase in the processing time due to the generation of unnecessary data. Conversely, generating range data having an in-plane resolution or depth-direction range resolving power lower than the requested resolution or range resolving power makes it difficult to maintain the accuracy of processing using the range data.

The present invention has been made in consideration of the above-described problems, and provides a technique of generating range data having the accuracy necessary for image processing in consideration of the in-plane resolution or depth-direction range resolving power requested by the processing using the range data.

SUMMARY OF THE INVENTION

According to one aspect of the present invention, there is provided a range image generation apparatus comprising: a generation unit adapted to generate a first range image of a target measurement object at one of a predetermined in-plane resolution and a predetermined depth-direction range resolving power; an extraction unit adapted to extract range information from the first range image generated by the generation unit; and a determination unit adapted to determine, as a parameter based on the range information extracted by the extraction unit, one of an in-plane resolution and a depth-direction range resolving power of a second range image to be generated by the generation unit, wherein the generation unit generates the second range image using the parameter determined by the determination unit.

Further features of the present invention will be apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

In this embodiment, an example of an object position and orientation measurement apparatus will be described, which includes a range-image processing module used, to measure the position and orientation of a part, in a robot system configured to execute a task, such as picking a part from a part group on, for example, a production line of a factory. Note that in this embodiment, three-dimensional range measurement is done using a spatial-encoding method. The distance from an image capturing apparatus to a target measurement object is defined as range information. A two-dimensional image containing the range information as a luminance value is defined as range data (range image). The in-plane resolution of the range data is defined as the range-data parameter.

Figure 1:
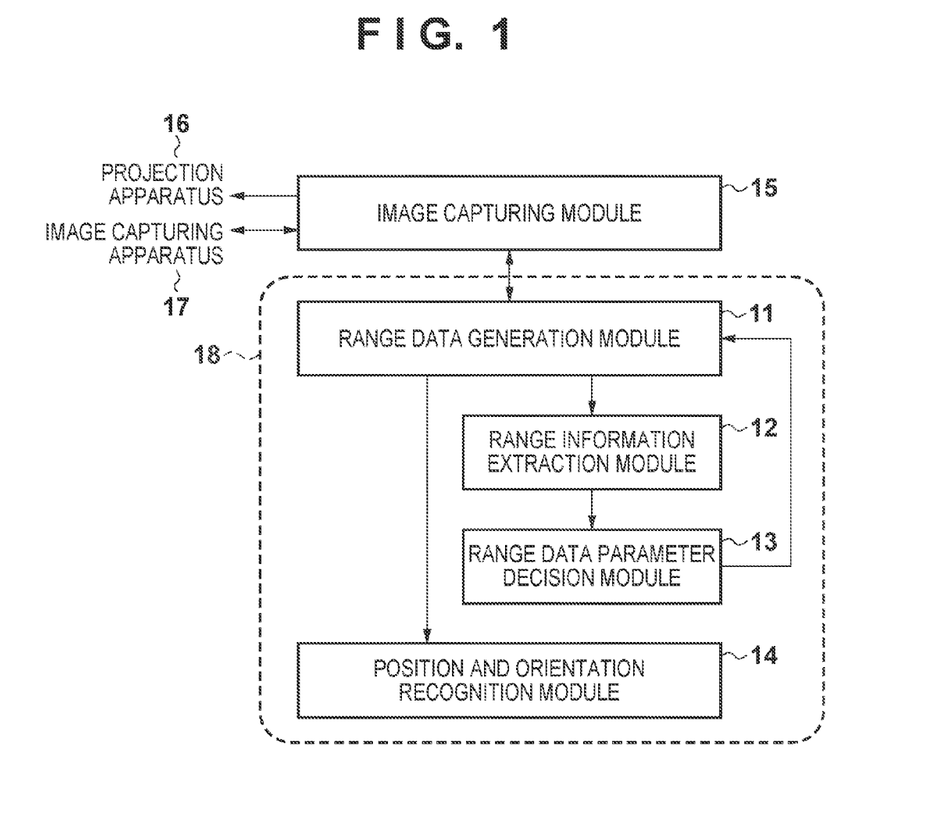
FIG. 1 is a functional block diagram of an object position and orientation measurement apparatus according to the first embodiment.

The arrangement of the object position and orientation measurement apparatus having the function of a range-image generation apparatus of this embodiment will be described first with reference to FIG. 1. An image capturing module 15 is connected to a projection apparatus 16 such as a projector that projects, from above a part group, a spatial-encoding pattern with 0 and 1 bits embedded, an image capturing apparatus 17, such as a camera, that captures the part group, and a range-image processing module 18. The image capturing module 15 has a function of receiving an image captured by the image capturing apparatus 17. The range-image processing module 18 includes a range data generation module 11, a range-information extraction module 12, a range-data-parameter decision module 13, and a position and orientation recognition module 14. The range-data generation module 11 has a function of generating range data representing the distance from the image capturing apparatus 17 to the part group based on the image received from the image capturing module 15. The range-information extraction module 12 has a function of extracting arbitrary range information from the range data generated by the range-data generation module 11. The range-data-parameter decision module 13 has a function of determining, based on the range data generated by the range-data generation module 11, the parameter of range data to be generated next by the range-data generation module 11. The range-data-parameter decision module 13 may determine the parameter based on a value requested by the position and orientation recognition module 14.

The position and orientation recognition module 14 functions as a so-called image processing unit and has a function of recognizing the position and orientation of a part based on the range data generated by the range-data generation module 11 and the two-dimensional image obtained from the image capturing apparatus 17.

Note that although in this embodiment, the modules for implementing the respective functions are defined as described above, these definitions do not limit the scope of the present invention. For example, the image capturing module 15 is defined. The image capturing module 15 may be defined as a module included in the range-data generation module 11. That is, the above-described definitions are merely set to explain the units necessary for the object position and orientation measurement apparatus to be described in this embodiment for implementing processing to be described later, and any other definitions are not excluded. In addition, the image capturing module 15 and the range-image processing module 18 whose operations are controlled by a control unit (not shown) are generally formed from a computer. However, the present invention is not limited to the arrangement.

Figure 2:
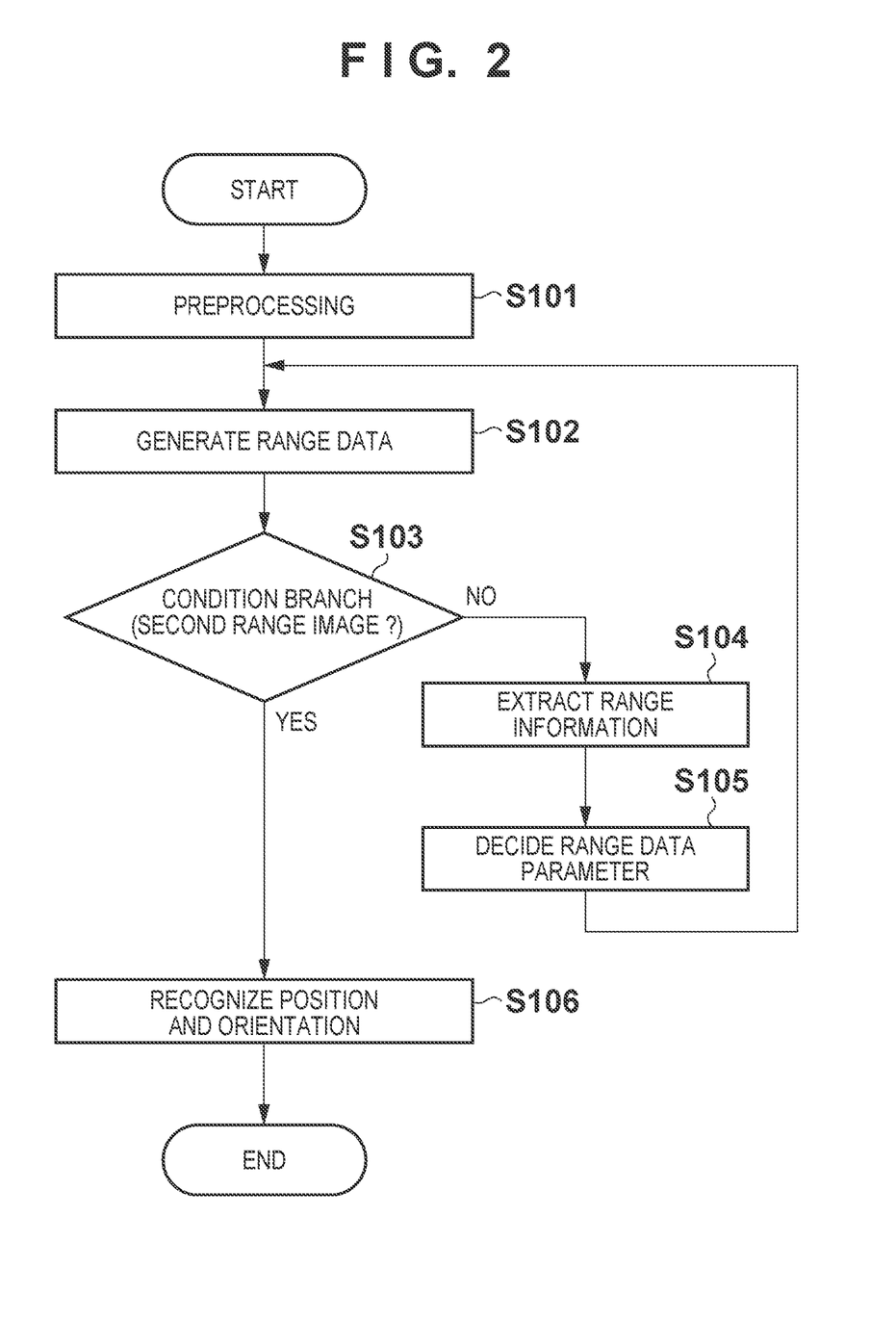
FIG. 2 is a flowchart showing the procedure of processing of the object position and orientation measurement apparatus according to the first embodiment.

The procedure of the operation of the object position and orientation measurement apparatus according to this embodiment will be described next with reference to the flowchart of FIG. 2.

In step S101, the image capturing module 15 performs preprocessing. The image capturing module 15 acquires images obtained by causing the image capturing apparatus 17 to capture the part group under the all-on condition and the all-off condition. The all-on condition is the condition that a pattern including only spatial codes "1" is projected. An image captured under this condition is defined as an all-on image. The all-off condition is the condition that all the spatial codes are "0", that is, no spatial-encoding pattern is projected. An image captured under this condition is defined as an all-off image.

In step S102, the range-data generation module 11 generates range data. The image capturing apparatus 17 performs image capturing for part-range measurement and transfers the captured image to the image capturing module 15. The range-data generation module 11 receives the image from the image capturing module 15 and generates range data.

The process of step S102 is executed after the process of step S101 or after the process of step S105 to be described later. When step S102 is executed after step S101, first range data is generated based on a number N1 of times of projection of a spatial-encoding pattern to be used to generate first range data (first range image). The first range data of the target measurement object may be acquired at a predetermined in-plane resolution. On the other hand, when step S102 is executed after step S105 to be described later, a number N2 of times of projection of a spatial-encoding pattern to be used to generate second range data (second range image) is determined based on the parameter determined by the range-data-parameter decision module 13 and the range information extracted by the range-information extraction module 12. Second range data is generated by the number N2 of times of projection. The first range data is used to determine the parameter of the second range data. The second range data is used to set a processing region for image processing or when the position and orientation recognition module 14 executes position and orientation recognition processing.

In step S103, the range-image processing module 18 determines which range data is generated by the range-data generation module 11, first range data or second range data. Upon determining that the data is first range data (NO in step S103), the process advances to step S104. Upon determining that the data is second range data (YES in step S103), the process advances to step S106.

In step S104, the range-information extraction module 12 extracts, from the first range data, range information up to the captured part group at the position closest to the image capturing apparatus. In step S105, the range-data-parameter decision module 13 determines, based on the range information and the value requested by the position and orientation recognition module 14 as the range-data parameter, the parameter of second range data to be generated next by the range-data generation module 11. After that, the process returns to step S102 to perform processing necessary for generating second range data having the determined parameter.

In step S106, the position and orientation recognition module 14 detects the position of the part at the highest position of the part group based on the second range data. The position and orientation recognition module 14 performs position and orientation recognition processing in a region including the part. The procedure of the operation of the object position and orientation measurement apparatus according to this embodiment has been described above.

Out of the operation of the object position and orientation measurement apparatus according to this embodiment, steps that need more explanations will be described in more detail.

In step S102, to perform three-dimensional range measurement by the spatial-encoding method, the projection apparatus 16 projects spatial-encoding patterns to parts a plurality of number of times. The image capturing apparatus 17, such as a camera, captures the parts on which the spatial-encoding patterns are projected. A plurality of images captured by the image capturing apparatus 17 are transferred to the image capturing module 15. The spatial-encoding patterns according to this embodiment are projected sequentially from a lower bit to a higher bit as the number of times of projection increases.

When generating first range data, the spatial-encoding patterns are projected in accordance with the preset number N1 of times of projection. From the viewpoint of processing time and efficiency, N1 can be a value equal to or smaller than the minimum value predicted from the number N2 of times of projection of the spatial-encoding pattern to be used to generate second range data. In this embodiment, N1 is the number of bits of a spatial-encoding pattern when the range-measurement density (the pattern width of the spatial-encoding pattern) is equal to or less than the shortest side of a part at a distance h/2 at the center of a distance h from the image capturing apparatus 17 to the bottom of the part group.

When generating second range data, the number N2 of times of projection is determined based on the parameter determined by the range-data-parameter decision module 13 and the range information extracted by the range-information extraction module 12. Spatial-encoding patterns are projected in accordance with the number N2 of times of projection.

More specifically, when an in-plane resolution RN (number of range-measurement points/mm) is designated as the parameter of second range data at a position apart from the image capturing apparatus 17 by the distance extracted by the range-information extraction module 12, the number of times of projection necessary for outputting range data having a resolution equal to or higher than the in-plane resolution is calculated. For example, assume that the in-plane resolution of range data obtained by a 1-bit spatial-encoding pattern is R1 (number of range-measurement points/mm) at a position apart from the image capturing apparatus 17 by the distance extracted by the range-information extraction module 12. Assuming that R1 is known, the number N2 of times of projection is given by $$N2 = \log 2(RN/R1) + 1$$

If N2 is a decimal fraction, the decimal places are rounded up. If the number N1 of times of projection ≥ the number N2 of times of projection, neither projection nor image capturing is performed, and the first range data is re-output as second range data.

Next, the range-data generation module 11 generates, by the spatial-encoding method, range data from a plurality of images received from the image capturing module 15. More specifically, a spatial-code image having, as pixel values, spatial codes observed by decoding the plurality of images are generated. Range data is then generated by triangulation based on the code image.

An example of the procedure of code-image generation will be described here. The numbers of vertical and horizontal pixels of a code image are assumed to match those of a captured image. Place focus on one point (x0,y0) in the image for the sake of simplicity. First, the average image between the luminance value of the all-on image and that of the all-off image is generated. An image obtained by projecting a 1-bit spatial-encoding pattern is binarized using the average image as the threshold. More specifically, if a value is smaller than the threshold, 0 is set. If a value is larger than the threshold, 1 is set. This is code information. The code at (x0,y0) of the binary image is read. The code value is substituted into (x0, y0) of code coordinates. The binarization processing and the code-value substitution processing are defined as code-generation processing altogether. Next, an image obtained by projecting a 2-bit spatial-encoding pattern is binarized in accordance with the same procedure as described above, and the code at (x0,y0) of the binary image is read. The value at (x0,y0) on the code image is shifted to left, and the read code is embedded in a lower bit. This processing is repeated as many times as the number of times of spatial-encoding pattern projection. A code image is generated by applying the above-described processing to all points on the code image.

Figure 3A:
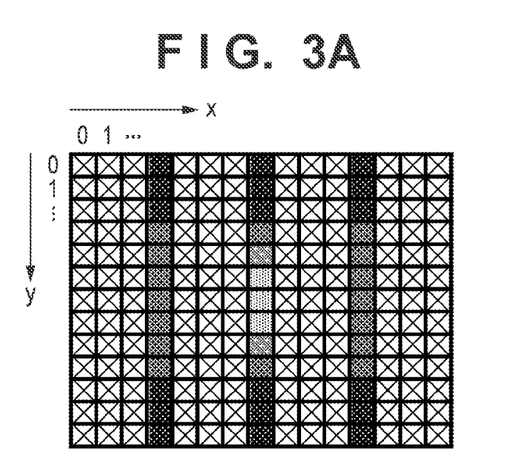
FIGS. 3A to 3C are views showing first range data and second range data according to the first embodiment.

In step S104, the range-information extraction module 12 extracts range information from range data. Range-information extraction processing will be described below with reference to FIG. 3A. FIG. 3A shows an example of first range data. The origin is set at the upper left corner of the image, and the pixels are associated with the coordinates. As shown in the explanatory legends of FIG. 3C, the shading becomes lighter in the height direction of the part group so as to indicate that a part is located at a higher place. Since first range data is generated using a few spatial-encoding patterns, range measurement is not performed in some places. Interpolation processing may be applied to the portions between measured portions so that all pixels of first range data can have range information. In this example, however, no interpolation processing is performed for the sake of simplicity. In FIG. 3A, only parts are captured, and no jigs are included. Even if a jig is included, range data for only parts can be obtained by calculating the background difference from range data obtained without placing the parts. In this embodiment, part picking is assumed to be done from the top of the part group, and the range information of the longest portion of range data is extracted. In the example of first range data shown in FIG. 3A, pixels representing the highest part position in the effective measurement region are (x,y)=(7,5), (7,6), and (7,7). At this time, range information held by these pixels is extracted.

In step S105, the range-data-parameter decision module 13 determines, based on the value requested by the position and orientation recognition module 14 as the parameter of second range data, the parameter of second range data to be generated next by the range-data generation module 11. In this embodiment, position and orientation recognition processing is performed in step S106 for the part located at the highest position out of the part group. For example, assume that the shortest side of the part is 10 (mm). To always perform range measurement for at least one point on the part surface, the in-plane range-measurement interval at the highest position of the part group needs to be 10 (mm) or less. Performing measurement under this condition allows the apparatus to avoid any situation that, for example, the part at the highest position out of the part group exists between the range-measurement timings and cannot undergo range measurement, that is, detection of the part at the highest position out of the part group is impossible. In this case, a value representing the range-measurement interval of 10 (mm) is set as the request of the position and orientation recognition module 14 for the parameter of second range data. Hence, 1/10 (number of range-measurement points/mm), that is, 0.1 is set as the parameter of second range data, that is, the in-plane resolution. After that, the process returns to step S102 to perform processing necessary for generating second range data having the determined parameter.

Figure 3B:
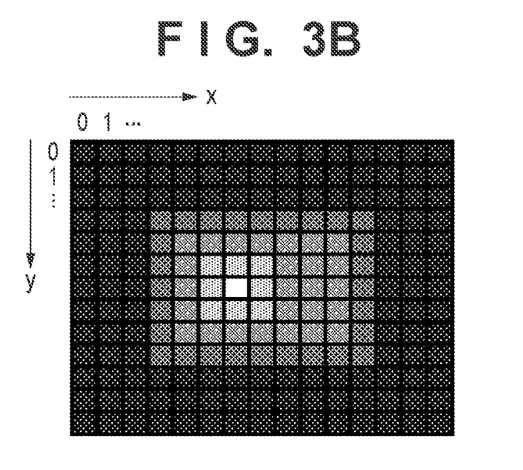
Figure 3C:
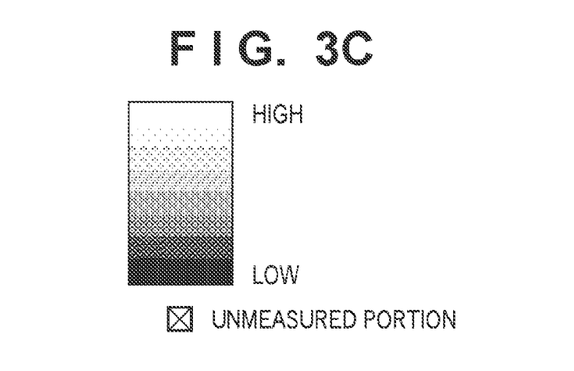

Finally, in step S106, the position and orientation recognition module 14 performs part position and orientation recognition processing based on the range data. In this embodiment, a square region having a side twice as long as the longest side of the part is set as the processing region of the position and orientation recognition processing about the coordinates of a point having range information corresponding to the part at the highest position out of the second range data. This will be described in detail with reference to FIG. 3B that illustrates an example of second range data. The highest pixel in the example of second range data shown in FIG. 3B is (x,y)=(6,6). When a length twice the length of the longest side of the part corresponds to three pixels on the second range-data image of FIG. 3B, a square region (rectangular region) whose vertices are at four points (5,5), (5,7), (7,5), and (7,7) is set as the processing region. Position and orientation recognition processing, such as template matching, is done for the all-on image in that region thereby obtaining the position and orientation of the part. Not the all-on image but an image captured under an arbitrary illuminance, such as an all-off image, may be used. The position and orientation recognition processing is not the gist of the present invention, and a detailed description thereof will be omitted.

In this embodiment, the spatial-encoding patterns are projected sequentially from a lower bit to a higher bit. However, they can be projected in any order as far as all spatial-encoding patterns necessary for the designated number of times of projection are prepared. Capturing the all-on image and the all-off image need not be done before spatial-encoding pattern projection. The image capturing may be done during spatial-encoding pattern projection.

In this embodiment, when the in-plane resolution RN is designated as the parameter of second range data, the number of times of projection necessary for outputting range data having a resolution equal to or higher than the in-plane resolution is calculated. Alternatively, each calculation result may be held in a lookup table in advance and read out.

In this embodiment, one spatial-encoding pattern is projected for each bit. However, a spatial-encoding pattern whose bits are inverted may additionally be projected for each bit. This allows the apparatus to improve the binarization accuracy at the time of code-image generation and more accurately generate a code image.

Pattern projection and image capturing may always be executed independently of which one of the above-described steps is being executed. In this case, the spatial-encoding patterns are projected sequentially from a lower bit to a higher bit, and this processing is continued until the spatial-encoding pattern of the highest bit of the object position and orientation measurement apparatus is projected. Alternatively, the processing is continued until the spatial-encoding pattern of the bit necessary for generating second range data is projected. Captured images are sequentially held by the image capturing module 15, and the range-data generation module 11 can extract a necessary image from the image capturing module 15. The range-data generation module 11 can immediately extract an image whose capturing has ended from the image capturing module 15. This allows a reduction in the wait time of the process of step S102.

In step S102, the number N1 of times of projection is determined based on the distance h/2 at the center of the distance h from the image capturing apparatus 17 to the bottom of the part group. However, this is merely an example. N1 may be determined based on, for example, the assumable maximum height of the part group. For example, if the assumable maximum height of the part group is h/4, the number of bits of the spatial-encoding pattern when the range-measurement density is equal to or less than the shortest side of the part at that height is set as N1.

In step S104, the range-information extraction module 12 extracts the range information of the part at the highest position of the range data. However, this may be an arbitrary value. For example, range information closest to the height at which the robot system can easily pick a part may be extracted. In this embodiment, in step S105, the position and orientation recognition module 14 uses the second range data to set the processing region of position and orientation recognition processing. As the range-measurement interval (associated with the number of bits of the spatial-encoding pattern) requested by the position and orientation recognition module 14, the length of the shortest side of the part is set. However, the present invention is not limited to this. The range-measurement interval may be determined based on the number of bits necessary for the processing to be executed by the position and orientation recognition module 14.

In step S102, the range-data generation module 11 determines the number N2 of times of projection based on the parameter of the second range data determined in step S105. However, the number N2 of times of projection may be determined in step S105. That is, the range-data-parameter decision module 13 may determine, the number N2 of times of projection necessary for generating second range data based on the first range data. Alternatively, the number N2 of times of projection may be determined based on the first range data and the value requested by the position and orientation recognition module 14 as the range-data parameter.

The in-plane resolution or depth-direction range resolving power may be stored in association with each range information, and based on this association, an in-plane resolution or depth-direction range resolving power corresponding to extracted range information may be determined as the parameter.

In step S106, region setting is not particularly limited. For example, a rectangular region may be set about the coordinates of a point having range information at which the robot system can easily pick a part out of the range data. For that region, for example, a circular region having a radius equal to the length of the longest side of the part may be set.

Second Embodiment

In this embodiment, a case will be described in which a storage device such as a memory for holding a code image is provided in a range-data generation module 11 to hold the code image of first range data in step S102 of the first embodiment. Note that in this embodiment, only points different from the object position and orientation measurement apparatus of the first embodiment will be explained. The remaining portions are the same as in the first embodiment, and a description thereof will be omitted.

In this embodiment, assume that first range data is generated by spatial-encoding pattern up to 2 bits, and second range data is generated by spatial-encoding patterns up to 3 bits.

Figure 4A:
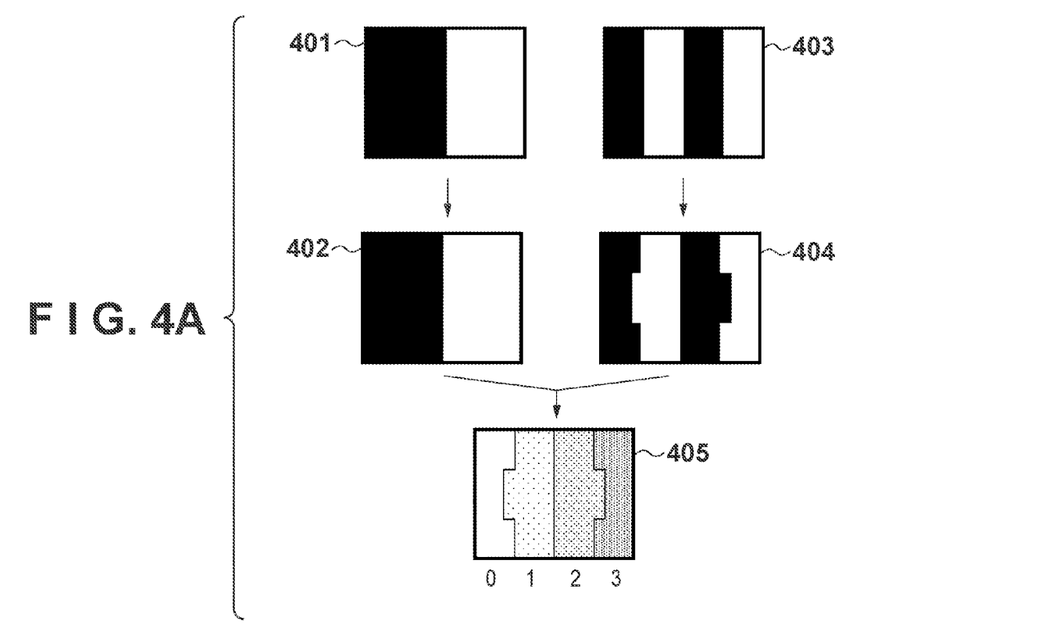
FIGS. 4A and 4B are views showing the procedure of generating the code image of second range data according to the second embodiment.

FIG. 4A shows the procedure of generating the code image of first range data according to this embodiment. The code image of first range data is generated by two image capturing processes, that is, using spatial-encoding patterns 401 and 403. The spatial-encoding pattern 401 or 403 is projected to the target measurement object. The captured image is binarized to obtain a binary image 402 or 404. A code image 405 of first range data is generated from the two images. In the code image 405, a halftone level indicates a code value. Black lines are drawn at the boundaries between the code values in consideration of the visibility. However, the lines do not exist in an actual code image. The code image 405 is stored in the storage device.

Figure 4B:
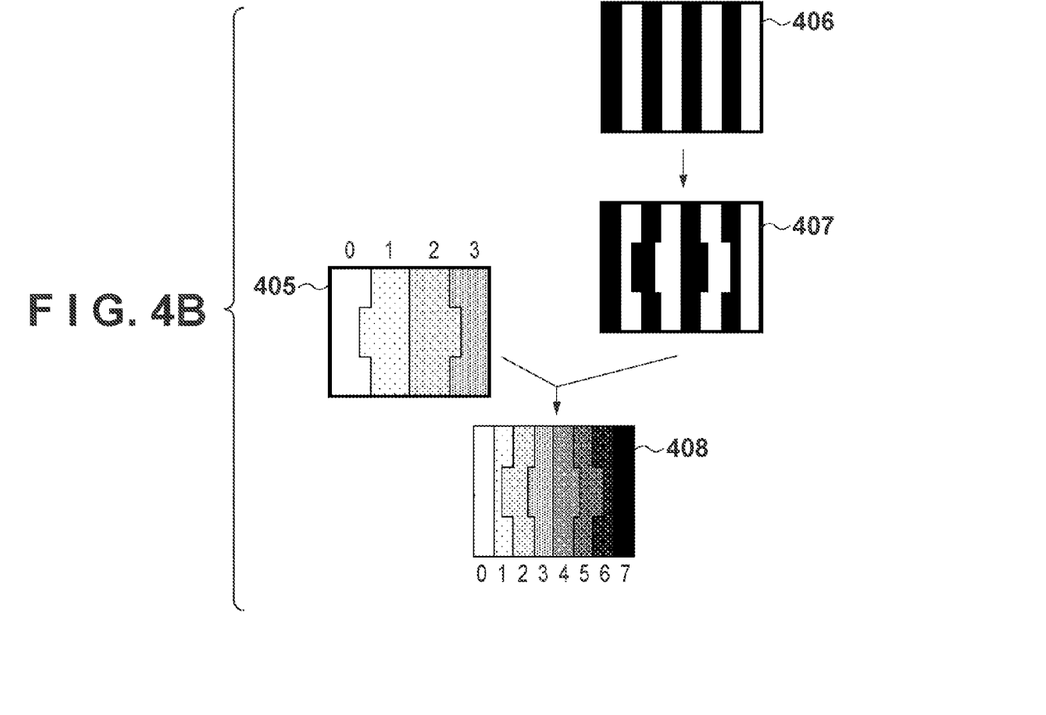

FIG. 4B shows the procedure of generating the code image of second range data according to this embodiment. In the normal method, the code image of second range data is generated by three image capturing processes, that is, using spatial-encoding patterns 401, 403, and 406. In this embodiment, however, projection of the spatial-encoding patterns 401 and 403, image capturing, and code generation processing are omitted, and only the spatial-encoding pattern 406 is projected. An image obtained by capturing the spatial-encoding pattern is binarized to obtain a binary image 407. Next, in the code generation processing, a code image 408 of second range data is generated using the binary image 407 and the code image 405 held in the storage device. Reusing the code image of the first range data to generate second range data in the above-described way enables the omitting of projection of spatial-encoding pattern light projected to generate the first range data, image capturing, and code generation processing. It is therefore possible to shorten the processing time of second range-data generation. In this embodiment, for example, if one cycle of image capturing, projection, and code generation processing takes 100 (ms) in total, the processing time can be shortened by 100 (ms) as compared to the case in which all spatial-encoding patterns are projected when generating second range data.

Third Embodiment

In the first embodiment, the range-data generation module 11 generates two kinds of range data, that is, first range data and second range data, and the second range data is used by the position and orientation recognition module 14. In the third embodiment, a case will be explained in which a range-data generation module 11 further generates third range data, and image processing is performed using the third range data as well. Note that in this embodiment, only points different from the object position and orientation measurement apparatus of the first embodiment will be explained. The remaining portions are the same as in the first embodiment, and a description thereof will be omitted.

Figure 5:
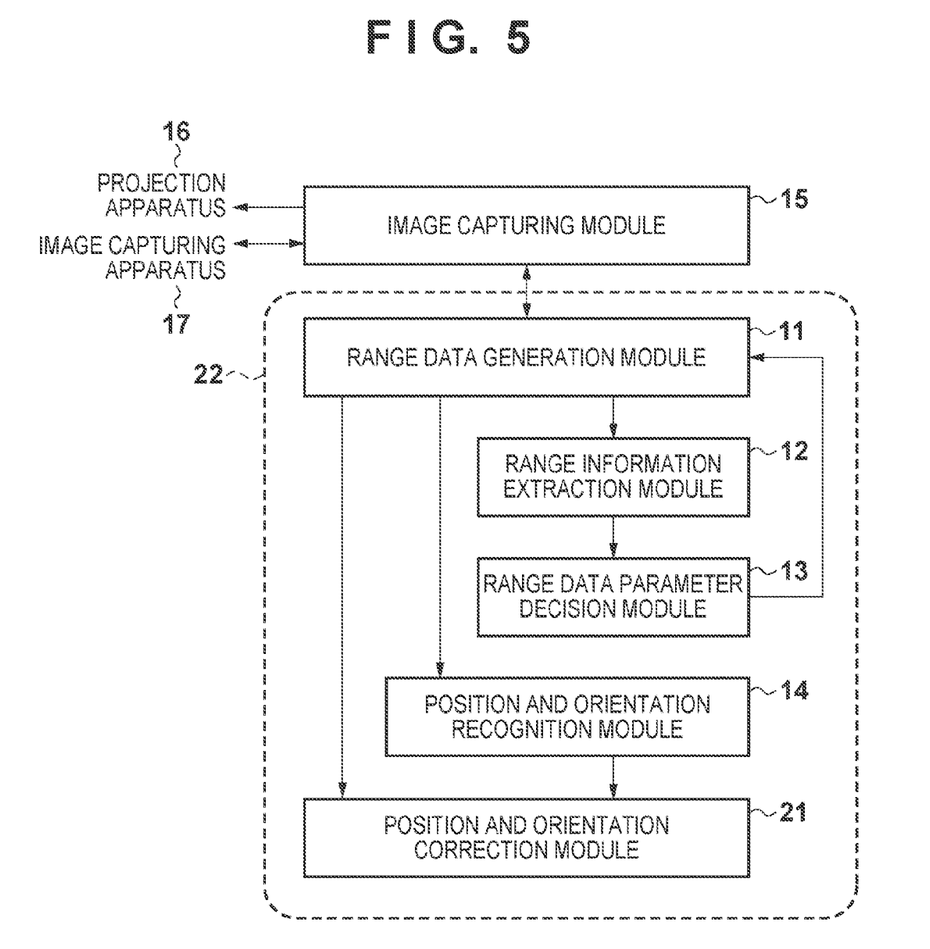
FIG. 5 is a functional block diagram of an object position and orientation measurement apparatus according to the third embodiment.

The arrangement of an object position and orientation measurement apparatus according to this embodiment will be described first with reference to FIG. 5. Referring to FIG. 5, a range-image processing module 22 includes the range-data generation module 11, a range-information extraction module 12, a range-data-parameter decision module 13, a position and orientation recognition module 14, and a position and orientation correction module 21. The position and orientation correction module 21 corrects the position and orientation of a part using the three-dimensional geometric data of a part, the position and orientation of the part generated by the position and orientation recognition module 14, and third range data (third range image) generated by the range-data generation module 11.

Figure 6:
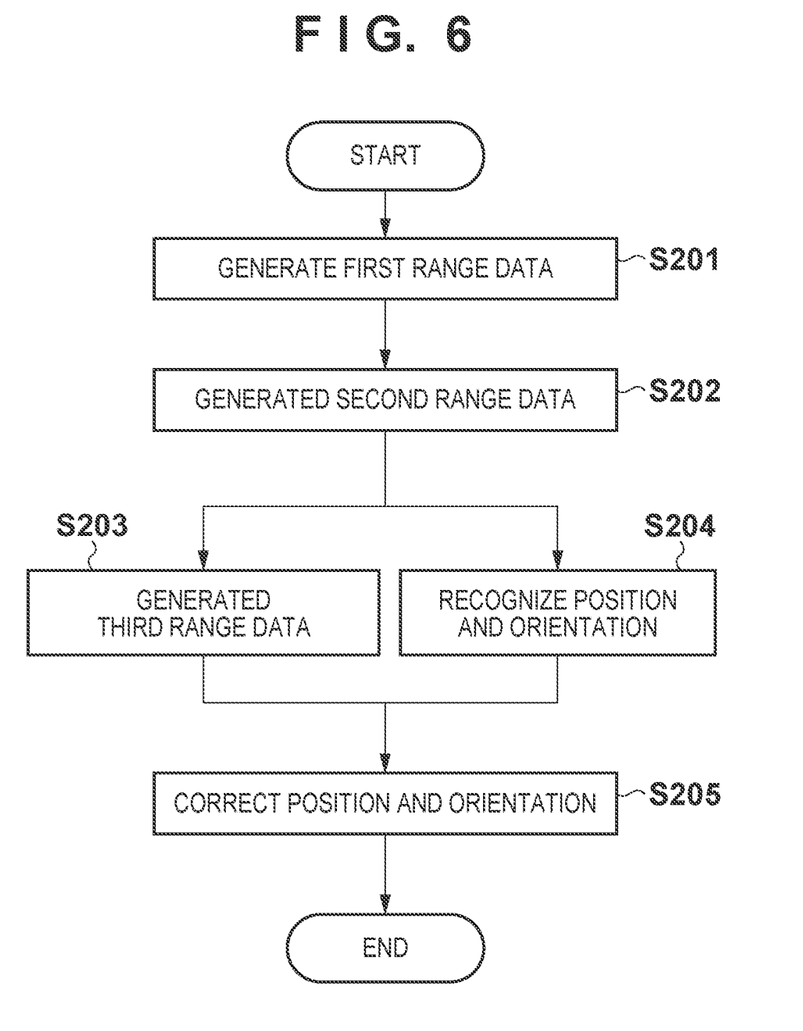
FIG. 6 is a flowchart showing the procedure of processing of the object position and orientation measurement apparatus according to the third embodiment.

The procedure of the operation of the object position and orientation measurement apparatus according to this embodiment will be described next with reference to the flowchart of FIG. 6.

In step S201, the range-data generation module 11 generates first range data after preprocessing, as in steps S101 and S102 of the first embodiment.

In step S202, the range-data generation module 11 generates second range data, as in steps S102 to S105 of the first embodiment.

In step S203, image capturing for range measurement of parts is executed. Images captured by an image capturing apparatus 17 are transferred to an image capturing module 15, and the range data generation module 11 generates third range data. The third range data has an in-plane resolution or depth-direction range resolving power equal to or higher than that of the second range data.

In step S204, the position and orientation recognition module 14 performs part position and orientation recognition processing based on the second range data, as in step S106 of the first embodiment.

The processes of steps S203 and S204 are performed in parallel. After both the processes of steps S203 and S204 have ended, the process of step S205 is executed.

In step S205, the position and orientation correction module 21 defines the part position and orientation generated by the position and orientation recognition module 14 as an initial position and orientation, and applies the third range data to the three-dimensional geometric data of the part, thereby calculating and correcting the position and orientation information of the part. For example, for each point of range data, the closest point on the plane in the three-dimensional geometric data of the part is obtained. The position and orientation of the part are repetitively corrected so as to minimize the sum of squares of the three-dimensional distance between them, thereby finally obtaining an accurate position and orientation.

The procedure of the operation of the object position and orientation measurement apparatus according to this embodiment has been described above.

Fourth Embodiment

Note that the three-dimensional range measurement can be performed not only by the above-described method but also using another method. For example, a light-section method may be used. In this case, the scanning pitch of slit light corresponds to the line width of a spatial-encoding pattern.

In this embodiment, the in-plane resolution of range data is defined as the range-data parameter. However, this may be defined as a depth-direction range resolving power or the number of range-data tones upon digitization. That is, when a range-data-parameter decision module 13 determines the range-data parameter of the second range data, the request of a position and orientation recognition module 14 for the range-data parameter may be the depth-direction range resolving power. A range-data generation time may be defined as the range-data parameter. In this case, the time requested for generating first range data and determining the range-data parameter is subtracted from the requested generation time. After obtaining the maximum number of images that can be captured within that time, second range data may be generated. For example, assume that one cycle of projection, image capturing, and code generation processing takes a time t in total. Letting T be the requested generation time, N1 be the number of times of projection necessary for first range-data generation, and t' be the time necessary for determining the range-data parameter, a time T' usable to generate second range data is given by $$T'=T-(t \times N1+t')$$

Hence, the possible number N2' of times of image capturing within T' (the number of times of image capturing necessary for generating second range data) is given by $$N2'=T' \div t$$

That is, the second range data is generated by the number N2 of spatial-encoding patterns, which is given by $$N2=N2'+N1$$

In addition, there may be a plurality of requests of a position and orientation recognition module 14 for the range-data parameter. In this case, the parameter may be determined to satisfy all conditions or give priority to any one of them.

In this embodiment, the position and orientation recognition module 14 performs template matching after extracting range information from the second range data and setting the processing region. However, the position and orientation recognition module 14 may use the range data for processing other than the processing region setting. For example, if the position and orientation of a part are assumed to some extent, they may be regarded as the initial orientation, and position and orientation correction processing may be performed using the three-dimensional data of the part and the second range data.

According to the present invention, it is possible to generate range data having the accuracy necessary for image processing in consideration of the in-plane resolution or depth-direction range resolving power requested by processing using range data.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-279867 filed on Dec. 15, 2010, which is hereby incorporated by reference herein in its entirety.

What is claimed is:

1. A range image generation apparatus comprising:
a first generation unit configured to generate a first range image of a target measurement object at one of a predetermined in-plane resolution and a predetermined depth-direction resolving power by projecting a first pattern onto the target measurement object;
an extraction unit configured to extract range information from the first range image generated by said first generation unit;
a determination unit configured to determine, as a parameter based on the range information extracted by said extraction unit, at least one of an in-plane resolution and a depth-direction resolving power of a second range image; and
a second generation unit configured to generate the second range image of the target measurement object by projecting a second pattern onto the target measurement object based on the determined parameter.

2. The apparatus according to claim 1, wherein after the second range image is generated, said second generation unit further generates a third range image having one of a resolution higher than the in-plane resolution of the second range image and a range resolving power higher than the depth-direction resolving power.

3. The apparatus according to claim 2, wherein said first generation unit comprises:
a projection unit configured to project pattern light to be used to generate a spatial code on the target measurement object; and
an image capturing unit configured to capture the target measurement object on which the pattern light is projected by said projection unit,
wherein a spatial code image having the spatial code as a pixel value is generated based on a plurality of images captured for each pattern light by said image capturing unit, and a range image of the target measurement object is generated based on the spatial code image.

4. The apparatus according to claim 3, wherein said second generation unit generates the second range image by reusing the spatial code image generated upon generating the first range image.

5. The apparatus according to claim 3, wherein said second generation unit generates a third range image by reusing the spatial code image generated upon generating the first range image and a spatial code image generated upon generating the second range image.

6. The apparatus according to claim 3, wherein said determination unit stores one of the in-plane resolution and the depth-direction resolving power in association with each range information in advance, and determines one of an in-plane resolution and a depth-direction resolving power corresponding to the range information extracted by said extraction unit as the parameter.

7. A position and orientation measurement apparatus comprising:
the range image generation apparatus of claim 2; and
a measurement unit configured to measure a position and orientation of the target measurement object using the second range image generated by said second generation unit,
wherein the determination unit determines, as a parameter based on the range information extracted by said extraction unit and a request from said measurement unit, one of an in-plane resolution and a depth-direction resolving power of the second range image to be generated by said second generation unit.

8. The apparatus according to claim 7, further comprising a setting unit configured to set a region including predetermined range information from the second range image,
wherein said measurement unit measures the position and orientation of the target measurement object based on the region.

9. The apparatus according to claim 7, further comprising:
a correction unit configured to correct, based on three-dimensional geometric data of the target measurement object and the third range image, the position and orientation of the target measurement object measured by said measurement unit.

10. The apparatus according to claim 3, wherein the second generation unit generates the second range image which has the determined parameter by controlling the number of times the projecting unit projects the pattern light.

11. The apparatus according to claim 2, wherein said second generation unit comprises:
a projection unit configured to project pattern light to be used to generate a spatial code on the target measurement object; and
an image capturing unit configured to capture the target measurement object on which the pattern light is projected by said projection unit,
wherein a spatial code image having the spatial code as a pixel value is generated based on a plurality of images captured for each pattern light by said image capturing unit, and a range image of the target measurement object is generated based on the spatial code image.

12. A range image processing apparatus comprising:
a first range data generation unit configured to generate first range data of a target measurement object;
a second range data generation unit configured to generate second range data of the target measurement object;
an image processing unit configured to perform image processing based on the range data;
a range data parameter determination unit configured to determine, as a parameter based on a request of the image processing unit, at least one of an in-plane resolution and a depth-direction resolving power of the second range data to be generated by the second range data generation unit using the first range data generated by the first range data generation unit, wherein the second range data generation unit generates the second range data using the parameter set by said range data parameter determination unit and outputs the second range data to the image processing unit.

13. The apparatus according to claim 1, further comprising:
a measurement unit configured to measure a position and orientation of the target measurement object using the second range image generated by said second generation unit,
wherein said determination unit determines, as a parameter based on the range information extracted by said extraction unit and a request from said measurement unit, at least one of an in-plane resolution and a depth-direction resolving power of the second range image to be generated by said second generation unit.

14. A method of controlling a range image generation apparatus comprising:
a first generating step of generating a first range image of a target measurement object, which has one of a predetermined in-plane resolution and a predetermined depth-direction resolving power by projecting a first pattern onto the target measurement object;
an extracting step of extracting range information from the first range image generated in the first generating step;
a determining step of determining, as a parameter based on the range information extracted in the extracting step, at least one of an in-plane resolution and a depth-direction resolving power of a second range image; and
a second generating step of generating the second range image of the target measurement object by projecting a second pattern onto the target measurement object based on the determined parameter.

15. A computer-readable non-transitory storage medium storing a computer program which causes a computer to execute each step of a range image generation apparatus control method of claim 14.

* * * * *